Jan. 17, 1967     S. I. ASHWORTH     3,298,137
ABRADING MACHINE
Filed Sept. 2, 1964     2 Sheets-Sheet 1

INVENTOR.
STEWART IVES ASHWORTH

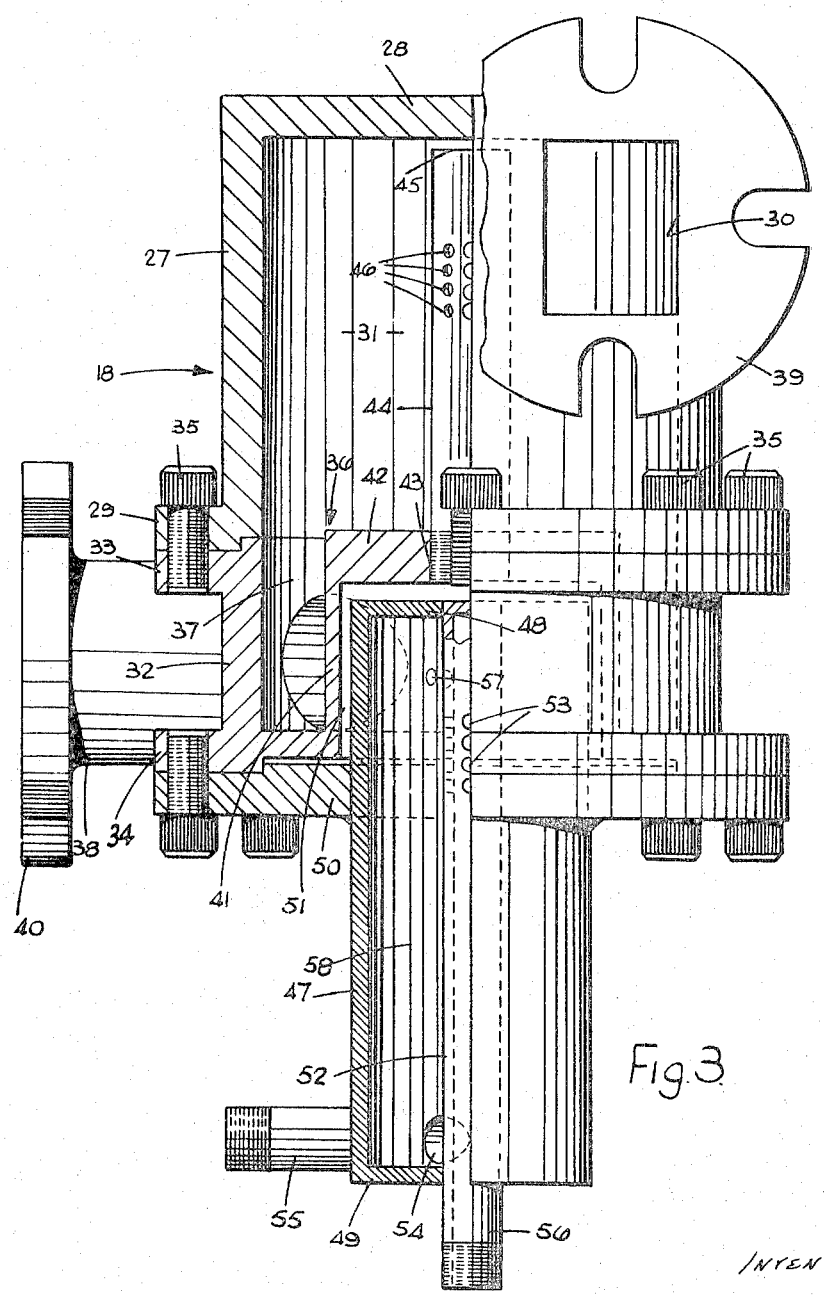

United States Patent Office

3,298,137
Patented Jan. 17, 1967

3,298,137
ABRADING MACHINE
Stewart Ives Ashworth, Outhill, near Studley, England, assignor to Abrasive Developments Limited, Solihull, England, a British company
Filed Sept. 2, 1964, Ser. No. 393,954
Claims priority, application Great Britain, Sept. 10, 1963, 35,611/63
10 Claims. (Cl. 51—8)

This invention relates to centrifugal separators and to abrading machines including such separators. Such separators are particularly applicable to abrading machines having two sections, a first section in which an article to be treated is subjected to a stream of liquid and abrasive and a second section in which the article is washed to remove excess abrasive and the detritus produced as a result of the abrading treatment. In such machines a conveyor is normally provided to carry the articles to be treated through the machine and from the first section to the second section.

Water is usually the liquid which is used to carry the abrasive and is also used to wash the abrasive and detritus from the article after the latter has been abraded. In a typical example, the flow of liquid and abrasive into the first section to abrade the article may be at the rate of twenty gallons a minute. The flow of water into the second section to wash the articles may also be of the order of twenty gallons a minute. Since the wash water is drawn from an outside source of clean water it will be seen that there is an addition of twenty gallons of water a minute to the machine so that the latter would be swamped if the water was not removed. Similarly, if all the water was merely allowed to pass to waste, the abrasive would all be washed out of the machine in a very short space of time.

Various solutions have been proposed to overcome this problem. In one solution previously used the liquid, abrasive and detritus coming from both sections were allowed to pass through a filter so that all the liquid and detritus passed to waste and the abrasive was retained. The abrasive then had to be removed manually from the filter and shovelled back into the main tank of the machine to keep the liquid therein supplied with abrasive. Self-discharging filters have also been proposed but these are expensive and also suffer from the disadvantage of all filters that they tend to get clogged up. Moreover, if renewable filter elements are used in the filters this is an additional source of expense and time is lost in changing the filter elements.

Furthermore, in the previous proposals the pump which has drawn the mixture of liquid and abrasive from the tank to feed it to the nozzle means in the first section has had to deal with a concentrated suspension of abrasive in the liquid, the concentration being that at which the mixture is ejected from the nozzle means onto the article to be abraded. It is found that the pumps quickly wear out pumping such concentrated suspensions.

According to one aspect of the invention a centrifugal separator for treating a mixture of solid particles and a liquid comprises a swirl chamber extending axially between opposed ends, an inlet to the swirl chamber adjacent to one of said ends and opening into the chamber tangentially, a primary outlet from the chamber adjacent the other of said ends, the outlet leaving the chamber tangentially, a tube extending axially within the chamber from said other end to adjacent said one end, a plurality of radially directed holes in the tube wall adjacent to said one end of the chamber, and a secondary outlet in communication with the tube at a location remote from said holes.

The mixture entering the swirl chamber through the inlet is formed into a vortex and a first fraction containing the heavier particles is withdrawn through the primary outlet while the second fraction containing the lighter particles passes through the radial holes in the tube and passes to the secondary outlet.

Preferably, the separator includes a second swirl chamber extending axially between opposed ends and having an inlet adjacent to one of said ends, said inlet opening into the chamber tangentially and being connected to said tube, said secondary outlet being adjacent to the other of said ends of the second swirl chamber and leaving the chamber tangentially, a second tube extending axially within the second chamber from the other of said ends thereof to adjacent said one end, a plurality of radially directed holes in the second tube wall adjacent to said one end of the second chamber, and a tertiary outlet in communication with the second tube at a location remote from the holes therein.

In this arrangement, the output from the tube of the first swirl chamber passes into the second swirl chamber and forms a further vortex from which the heavier particles are removed through the secondary outlet and the lighter particles, which in an abrading machine are largely the detritus, are removed through the holes in the second tube and pass through the tertiary outlet.

In a preferred arrangement, the chambers are co-axial and the second chamber is partially telescoped within the first chamber at said other end of the latter and is of smaller cross section than the first chamber.

In this arrangement, said other end of the first swirl chamber may be closed by a bell housing and the tube in the first chamber may communicate with the interior of the bell housing which in turn communicates with the inlet of the second swirl chamber.

In this arrangement also, an annular space is provided between the wall of the first swirl chamber and the bell housing and the primary outlet leads off this annular space.

According to a further aspect of the invention, an abrading machine comprises a first abrading section, nozzle means in such section to direct a mixture of abrasive and liquid against an article to be abraded, a second section, washing means in the second section to wash an abraded article with liquid to remove abrasive and detritus remaining on the article after it has been abraded, a tank to collect liquid, abrasive and detritus from both of said sections, a pump to draw liquid, abrasive and detritus from the tank and to deliver it to a centrifugal separator according to the first aspect of the invention and a conduit connecting the nozzle means to the primary outlet of the separator.

In such a machine, therefore, the largest particles in the mixture delivered to the separator are delivered once more to the nozzle means and are used again for abrading an article in the first section.

Where the separator includes a second swirl chamber the abrading machine preferably includes means connecting the secondary outlet of the separator to the tank in such a position as to agitate the contents of the tank. It will be appreciated that the abrasive and detritus in the tank will sink to the bottom and it is desirable to agitate these solid particles so as to ensure that a uniform mixture is drawn from the tank by the pump.

In an arrangement in which a second swirl chamber is provided, there is preferably also provided valve means connected to the tertiary outlet, the valve means being controlled by the liquid level in the tank selectively to discharge from the machine the output from the tertiary outlet if the liquid level in the tank is at or above a predetermined level and to return said output to the tank if said liquid level falls below said predetermined level. The valve means may comprise a subsidiary tank connected to the first mentioned tank and containing a float-operated valve member which selectively discharges and returns said output.

The valve member may be an upwardly directed wedge pivotable about a horizontal axis selectively to direct the output of said tertiary outlet by impingement of said output on the inclined faces of the wedge.

The invention will now be described by way of example with reference to accompanying drawings in which:

FIGURE 3 is a view, partly in elevation and partly in section, of a separator embodying the invention.

Figure 1:
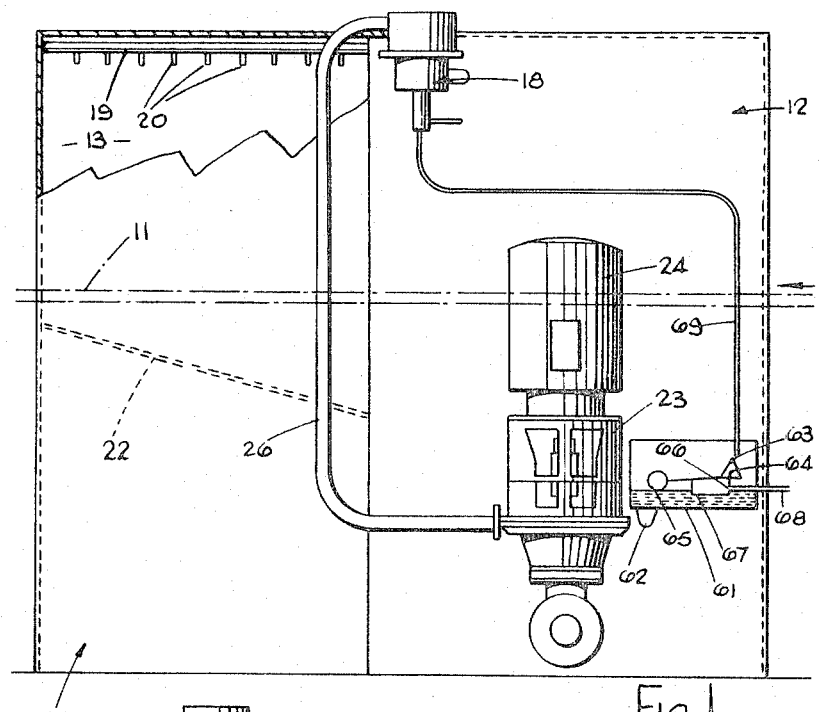
FIGURE 1 is a side elevation, partly broken away, of an abrading machine incorporating a separator embodying the invention.
Figure 2:
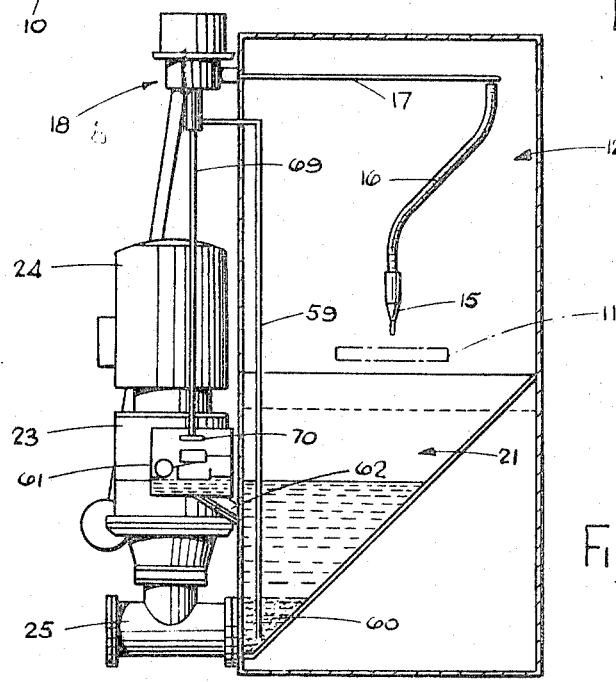
FIGURE 2 is an end view, partly in section, of the machine of FIGURE 1.

Referring now to FIGURES 1 and 2 the abrading machine comprises a cabinet 10 having a conveyor 11 extending longitudinally therethrough to carry articles through the cabinet. The machine is divided into two sections, a first section 12 in which an article on the conveyor is abraded and a second section 13 in which an article on the conveyor is washed to free the article from abrasive and detritus which may be adhering thereto after the article leaves the first section. The section 12 contains a gun or nozzle means 15 on the end of a flexible hose 16 and which is fed with abrasive and liquid from a conduit 17 connected to a separator 18. The section 13 contains a manifold 19 having a series of nozzles 20 which direct wash liquid downwardly onto an article on the conveyor 11.

Formed in the bottom of the section 12 is a tank 21, the tank being arranged beneath the part of the conveyor in the first section so that the mixture of liquid and abrasive which impinges on the article from nozzle means 15 in the first section falls directly into the tank after impinging on the article. The second section 13 is located at the side of the first section 12 and the wash liquid containing abrasive and detritus flows along the slopping bottom 22 of the second section and passes to the tank 21; the latter therefore contains substantially all the liquid and abrasive in the machine except for that actually being pumped or in use.

A main pumping circuit is provided which includes a pump 23 driven by an electric motor 24 and which draws a mixture of liquid, abrasive and detritus from the bottom of the tank 21 through a large pipe 25 and passes it through a pipe 26 to the centrifugal separator 18 which will hereinafter be described. The pump may be of the type described in British Patent No. 840,671 of Abrasive Developments Limited and dated November 14, 1957. A proportion of the liquid and substantially all the coarser particles of abrasive are delivered from the separator 18 to the conduit 17, pass to the nozzle means 15 and return to the tank 21 after having operated upon the article to be treated in the first section. Wash liquid, normally water, is supplied to the manifold 19 in the second section from a clean water supply so that there is a constant addition of liquid to the machine. It is therefore necessary constantly to remove liquid from the machine and this is achieved by the centrifugal separator 18 which also concentrates the liquid in the tank 21. However, this concentration is only carried out after the mixture in the tank has been pumped by the pump 23 so that the latter is not pumping a concentrated suspension. As a result the pump will have a considerably longer life than if it were pumping a concentrated suspension.

Referring now to FIGURE 3 the centrifugal separator 18 is formed from three sections (an upper section, an intermediate section, and a lower section) which are bolted together in superposed relation. The upper section 27 is cylindrical in cross section, is closed at its top 28 and has, at its lower end, and out-turned flange 29. An inlet 30 is formed in the cylindrical wall of the section adjacent the top thereof; the inlet is substantially tangential to the cylindrical wall of the section. The intermediate section 32 also has a cylindrical wall and has out-turned flanges 33 and 34 at its upper and lower ends respectively, the out-turned flange 33 at the upper end being secured to the out-turned flange 29 at the lower end of the upper section by pins 35. Formed internally in the intermediate section is a bell housing 36 which defines an annular space 37 between its outer wall and the inner wall of the section. A primary outlet 38 is formed in the cylindrical wall of the intermediate section so as to be tangential thereto. The axes of the inlet 30 and primary outlet 38 are substantially at right angles to one another when viewed in plan and have flanges 39 and 40 respectively for the attachment of the inlet pipe 26 and the conduit 17 respectively. The bell housing 36 has a substantially cylindrical wall 41 and a horizontal top 42. Screwed into an aperture 43 in the top 42 is a tube 44 which extends axially within the upper section 27. The tube 44 is closed at its top 45 and is provided with a series of radially extending holes 46 nearer to the inlet 30 than the outlet 38. The interior of the upper section 27 and the annular space 37 of the intermediate section together constitute a first swirl chamber 31.

The lower section comprises a cylindrical housing 47 closed at both its ends 48 and 49 and having external flange 50 which is secured to the flange 34 at the lower end of the intermediate section 32. The upper end 48 of the cylindrical housing 47 projects into the interior of the bell housing 36 in the intermediate section so that it is partly telescoped therein; a clearance 51 is left between the inner wall of the bell housing and the outer wall of the cylindrical chamber.

A tube 52 is secured within the cylindrical housing 47 and extends the whole length thereof and is co-axial with the housing. A series of radially extending holes 53 is provided in the tube nearer to the upper end of the housing 47 than the lower end thereof. At the lower end of the cylindrical housing 47 there is provided a secondary outlet 54 which joins the chamber tangentially and which communicates with a spigot 55. At its lower end, the tube 52 passes through the lower end 49 of the housing and forms a teritiary outlet 56. Tangential holes 57 are provided in the cylindrical wall of the housing adjacent the upper end thereof and these holes communicate with the clearance 51 between the upper end of the housing and the inner wall of the bell housing. The interior of the housing 47 provides a second swirl chamber 58.

In operation, the separator acts as follows, a mixture of liquid, abrasive and detritus enters through the inlet 30 to the first swiral chamber 31 adjacent the top of the chamber and, due to the tangential disposition of the inlet 30, swirals around the chamber 31 in a vortex having a vertical axis. The heavier, coarser particles are thrown to the outside wall of the chamber and pass downwardly towards the bottom of the vortex into the annular space 37 between the bell housing and the wall of the intermediate section and thus through the primary outlet 38. A proportion of the liquid will also pass through the primary outlet with the particles.

The remainder and major portion of the liquid with the finer particles passes through the radial holes 46 in the tube 44 adjacent the top of the vortex, passes down the tube into the clearance 51 and passes through the tangential holes 57 in the wall of the cylindrical housing into the second swirl chamber 58 and sets up a vertical vortex in the chamber. The coarser particles remaining in suspension and a proportion of the liquid will move to the wall of the chamber 58 and will pass downwardly to the bottom of the vortex and out of the tangential secondary outlet 55. The remainder of the liquid and the very fine particles will pass through the radial holes 53 in the tube 52 adjacent to the top of the vortex and down the tube to the tertiary outlet 56. It will be appreciated that the sizes of the particles to pass down the tubes 44 and 52 in the first and second swirl chambers 31 and 58 can be adjusted by varying the diameters of the tubes in the chambers.

Turning now to the operation of the abrading machine as a whole, the pump 23 draws the mixture of liquid and abrasive from the tank 21 through the pipe 25 and passes it along the pipe 26 downstream of the pump into the first swirl chamber 31 through the inlet 30. The coarser abrasive particles and a proportion of the liquid pass out of the primary outlet 38 of the first swirl chamber to the conduit 17, the hose 16 and the nozzle means 15 and are directed at the article to be abraded in the first section 12. The remainder of the liquid and the finer abrasive particles pass down the tube 44 into the second swirl chamber 58 where again a proportion of the liquid and the coarser particles pass out of the secondary outlet 55 and are returned by a pipe 59 connected to the spigot 55 to the bottom of the tank 21 in the first section to agitate the mixture therein and to prevent the abrasive 60 (see FIGURE 2) from blocking the pipe 25. The remainder of the liquid and the very fine particles, which include the detritus, pass into the tube 52, in the second swirl chamber and are discharged through the tertiary outlet 56.

The residue comprising the liquid, particles and detritus discharged from the tertiary outlet 56 may be allowed to flow directly to waste although preferably and as shown in FIGURES 1 and 2 valve means is provided to control the discharge of the residue. The valve means comprises a subsidiary tank 61 connected by a pipe 62 to the main tank 21 in the first section so that the liquid level in both tanks is the same. A valve member is mounted in the subsidiary tank in the form of a wedge 63 pivoted about a horizontal axis 64 so that the tapered faces of the wedge project substantially upwards above the axis. The axle upon which the wedge is mounted is bent at right angles at one end thereof and carries a ball float 65. The liquid level in the tanks 21 and 61 will thus determine the position of the wedge 63 by virtue of the float 65.

Directly under the wedge axis 64 is the wall 66 of a trough 67 having an outlet 68 going to waste. The residue from the tertiary outlet 56 of the separator is fed through a pipe 69 into a slot-like nozzle 70 located above the apex of the wedge. Depending upon the position of the wedge, the liquid discharged from the nozzle 70 will pass either into the trough 67 or into the subsidiary tank 61. The arrangement is such that, if the level in the main tank 21 is at or above a predetermined level, the ball float rises and operates the wedge to direct the residue into the trough 67 and thus to waste. If, however, the level in the main tank is below the predetermined level the ball valve operates the wedge member to deflect the residue into the tank 61 where it flows back to the main tank 21 through the pipe 62 until the level in the tank 21 reaches the said predetermined level.

It will be seen that the invention provides a centrifugal separator which, when mounted in an abrading machine, concentrates the diluted abrasive-liquid mixture continuously without the use of filters and without their disadvantages of expense and clogging up. Moreover, since the main pump 23 pumps a comparatively diluted suspension of abrasive in liquid the pump lasts longer than if it has to pump the concentrated suspension which is discharged from the nozzle means.

It will be appreciated that where necessary the parts of the machine and separator are lined with rubber or other abrasive-resisting material.

What I claim then is:

1. A centrifugal separator for treating a mixture of solid particles and a liquid comprising a swirl chamber extending axially between opposed ends, an inlet to the swirl chamber adjacent to one of said ends and opening into the chamber tangentially, a primary outlet from the chamber adjacent the other of said ends, the outlet leaving the chamber tangentially, a tube extending axially within the chamber from said other end to adjacent said one end, a plurality of radially directed holes in the tube wall adjacent to said one end of the chamber, and a secondary outlet in communication with the tube at a location remote from said holes.

2. A separator according to claim 1 and including a second swirl chamber extending axially between opposed ends, an inlet to the second swirl chamber adjacent to one of said ends thereof, said inlet opening into the chamber tangentially and being connected to said tube, said secondary outlet being adjacent to the other of said ends of the second swirl chamber and leaving the chamber tangentially, the second tube extending axially within the second chamber from the other of said ends thereof to adjacent said one end, a plurality of radially directed holes in the second tube wall adjacent to said one end of the second chamber, and a tertiary outlet in communication with the second tube at a location remote from the holes therein.

3. A separator according to claim 2, wherein the chambers are co-axial and the second chamber is partially telescoped within the first chamber at said other end of the latter and is of smaller cross section than the first chamber.

4. A separator according to claim 3, including a bell housing which closes said other end of the first swirl chamber, the tube in the first chamber communicating with the interior of the bell housing which in turn communicates with the inlet of the second swirl chamber.

5. A separator according to claim 4, wherein an annular space is provided between the wall of the first swirl chamber and the bell housing and wherein the primary outlet leads off the annular space.

6. An abrading machine comprising a first abrading section; nozzle means in such section to direct a mixture of abrasive and liquid against an article to be abraded; a second section, washing means in the second section to wash an abraded article with liquid to remove abrasive and detritus remaining on the article after it has been abraded; a tank to collect liquid, abrasive and detritus from both of said sections; a centrifugal separator comprising a swirl chamber extending axially between opposed ends, an inlet to the swirl chamber adjacent to one of said ends and opening into the chamber tangentially, a primary outlet from the chamber adjacent the other of said ends, the outlet leaving the chamber tangentially, a tube extending axially within the chamber from said other end to adjacent said one end, a plurality of radially directed holes in the tube wall adjacent to said one end of the chamber, and a secondary outlet in communication with the tube at a location remote from said holes; a pump to draw liquid, abrasive and detritus from the tank and to deliver it to the inlet of the centrifugal separator; and a conduit connecting the nozzle means to the primary outlet of the separator.

7. An abrading machine according to claim 6, including means connecting the secondary outlet to the tank at such a position as to agitate the contents of the tank.

8. An abrading machine according to claim 7, wherein the centrifugal separator includes a second swirl chamber extending axially between opposed ends, an inlet to the second swirl chamber adjacent to one of said ends thereof, said inlet operating into the chamber tangentially and being connected to said tube, said secondary outlet being adjacent to the other of said ends of the second swirl chamber and leaving the chamber tangentially, a second tube extending axially within the second chamber from the other of said ends thereof to adjacent said one end, a plurality of radially directed holes in the second tube wall adjacent to said one end of the second chamber, and a tertiary outlet in communication with the second tube at a location remote from the holes therein; the machine also including valve means connected to the tertiary outlet of the separator, the valve means being controlled by the liquid level in the tank selectively to discharge from the machine the output from the tertiary outlet if the liquid level in the tank is at or above a predetermined level and to return said output to the tank if said liquid level falls below said predetermined level.

9. An abrading machine according to claim 8, wherein the valve means comprises a subsidiary tank connected to the first mentioned tank and a float-operated valve member in the subsidiary tank which selectively discharges and returns said output.

10. An abrading machine according to claim 8, wherein the valve member is an upwardly directed wedge pivotable about a horizontal axis selectively to direct the output of said tertiary outlet by impingement of said output on the inclined faces of the wedge.

References Cited by the Examiner
UNITED STATES PATENTS

| | | | |
|---|---|---|---|
| 2,200,587 | 5/1940 | Tirrell | 51—8 |
| 3,052,361 | 9/1962 | Whatley et al. | 210—512 |
| 3,103,765 | 9/1963 | Nolan | 51—8 |
| 3,237,351 | 3/1966 | Millhiser | 51—12 X |
| 3,242,618 | 3/1966 | Kosar | 51—321 |

LESTER M. SWINGLE, *Primary Examiner.*